(12) United States Patent
Johnston et al.

(10) Patent No.: US 9,111,133 B2
(45) Date of Patent: Aug. 18, 2015

(54) USE OF UNKNOWN USER DATA FOR IDENTIFYING KNOWN USERS

(71) Applicant: Google Inc., Mountain View, CA (US)

(72) Inventors: Nicholas M. Johnston, Mountain View, CA (US); Ryan P. Doherty, Mountain View, CA (US)

(73) Assignee: Google Inc., Mountain View, CA (US)

( * ) Notice: Subject to any disclaimer, the term of this patent is extended or adjusted under 35 U.S.C. 154(b) by 133 days.

(21) Appl. No.: 13/799,855

(22) Filed: Mar. 13, 2013

(65) Prior Publication Data
US 2014/0270399 A1 Sep. 18, 2014

(51) Int. Cl.
*G06K 9/00* (2006.01)
*G06F 21/32* (2013.01)

(52) U.S. Cl.
CPC ............ *G06K 9/00288* (2013.01); *G06F 21/32* (2013.01)

(58) Field of Classification Search
None
See application file for complete search history.

(56) References Cited

U.S. PATENT DOCUMENTS

| 8,824,749 | B2 * | 9/2014 | Leyvand et al. | 382/118 |
| 2012/0195495 | A1 * | 8/2012 | Shiell et al. | 382/159 |
| 2013/0028522 | A1 * | 1/2013 | Perlmutter et al. | 382/197 |
| 2013/0121584 | A1 * | 5/2013 | Bourdev et al. | 382/190 |

FOREIGN PATENT DOCUMENTS

EP    2 533 171 A2    12/2012

OTHER PUBLICATIONS

Notification of Transmittal of the International Search Report and the Written Opinion of the International Searching Authority, or the Declaration, corresponding to PCT/US2014/024484, mailed Jul. 18, 2014, 12 pages.
Bolle et al., "Guide to Biometrics—Chapter 6—Identification System Errors", Dec. 31, 2004, pp. 87-104.

* cited by examiner

*Primary Examiner* — Atiba O Fitzpatrick
*Assistant Examiner* — David Perlman
(74) *Attorney, Agent, or Firm* — Harrity & Harrity, LLP

(57) ABSTRACT

A device may receive an image of a user. The device may compare the image to an image of a known user and an image of an unknown user. The device may select, based comparing the image to the image of a known user and the image of an unknown user, one of: the image of the known user, or the image of the unknown user. The device may identify, when the image of the known user is selected, the user as the known user. The device may not identify the user when the image of the unknown user is selected.

20 Claims, 12 Drawing Sheets

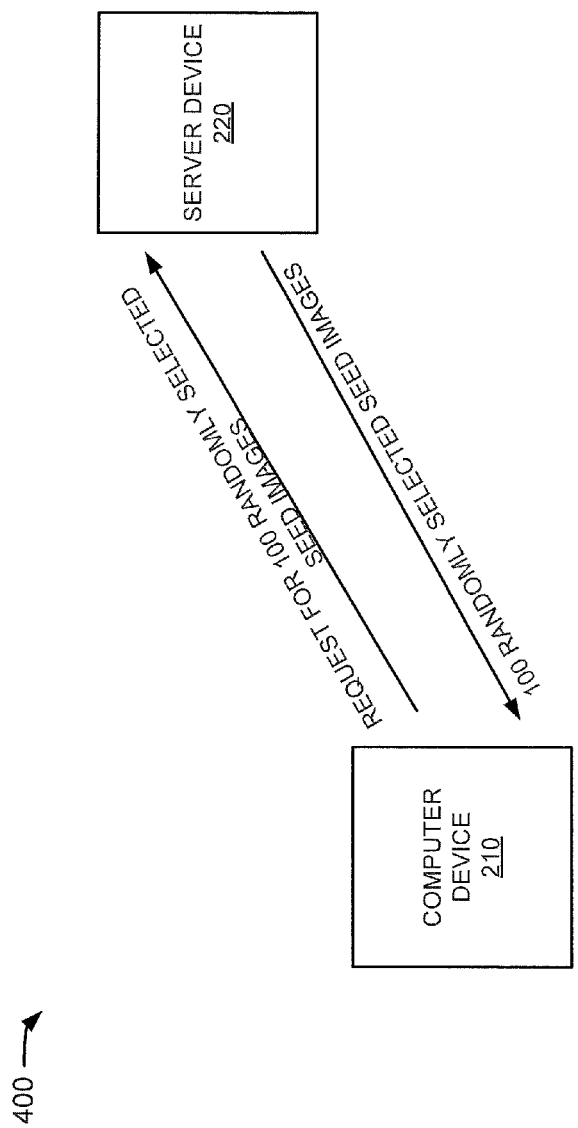

USE OF UNKNOWN USER DATA FOR IDENTIFYING KNOWN USERS

BACKGROUND

A user may wish to access a device, such as, for example, a tablet, laptop computer, mobile phone, etc., using a facial recognition application. Initially, the user may provide an image of the user to the device. The device may store and use the image as a template or control image for subsequently identifying the user. When the user desires to access the device, the user may allow the device to capture a second image of the user. The device may compare the second image to the stored image and may identify and grant the user access to the device based on the comparison.

SUMMARY

According to some possible implementations, a method may include receiving, by one or more processors of a device, an image of a user. The method further includes comparing, by the one or more processors, the image to a collection of images, the collection of images including a known image and a group of seed images. The method also includes determining, by the one or more processors and based on the comparing, whether the image of the user more closely matches the known image or a seed image, the seed image being included in the group of seed images. The method also includes selectively identifying, by the one or more processors, the user as a known user. The one or more processors identifying the user as the known user when the image of the user more closely matches the known image. The one or more processors do not identify the user when the image of the user more closely matches the seed image.

According to some possible implementations, the method further includes obtaining a set of known images, the set of known images including the known image. The method also includes seeding the set of known images with the seed images; and storing the seeded set of known images as the collection of images.

According to some possible implementations, a ratio of a quantity of the seed images to a quantity of known images included in the set of known images is at least 10 to 1.

According to some possible implementations, the method further includes modifying the known image to generate the group of seed images.

According to some possible implementations, the method further includes determining a first confidence value based on comparing the image of the user to the known image; and determining a second confidence value based on comparing the image of the user to the seed image. Determining whether the image of the user more closely matches the known image or a seed image includes determining that the image of the user more closely matches the known image when the first confidence value is greater than the second confidence value, where the image of the user is determined to more closely match the seed image when the first confidence value is not greater than the second confidence value.

According to some possible implementations, the method further includes receiving the known image. The method also includes determining a feature of the user based on the known image; and obtaining the group of seed images based on the feature.

According to some possible implementations, determining the feature of the user includes determining a numeric value corresponding to the feature. Obtaining the group of seed images includes modifying the numeric value, and obtaining the group of seed images based on the modified numeric value.

According to some possible implementations, a device includes one or more processors to receive an image of a user. The one or more processors are also to compare the image to a collection of images. The collection of images include an image of a known user and one or more images of unknown users. The one or more processors are further to determine, based on the comparing, whether the image of the user more closes matches the image of the known user or one of the one or more images of the unknown users. The one or more processors are also to selectively identify the user as the known user. The one or more processors identifying the user as the known user when the image of the user more closely matches the image of the known user, and the one or more processors not identifying the user when the image of the user more closely matches the one of the one or more images of the unknown users. The one or more processors are further to grant, when the user is identified as the known user, the user access to the device.

According to some possible implementations, the one or more processors are further to obtain a set of images of known users. The set of images of known users includes the image of the known user. The one or more processors are also to seed the set of images of known users with the one or more images of the unknown users; and store the seeded set of images of known users as the collection of images.

According to some possible implementations, a ratio of a quantity of the one or more images of unknown users is greater than a quantity of the set of images of known users.

According to some possible implementations, the one or more processors are further to modify the image of the known user to generate the one or more images of the unknown user.

According to some possible implementations, the one or more processors are further to determine a first confidence value based on comparing the image of the user to the image of the known user. The one or more processors are also to determine one or more second confidence values based on comparing the image of the user to the one or more images of the unknown users. When determining whether the image of the user more closely matches the image of the known user or the one or images of the unknown users, the one or more processors are to determine that the image of the user more closely matches the image of the known user when the first confidence value is greater than each of the one or more second confidence values.

According to some possible implementations, the one or more processors are further to receive the image of the known user. The one or more processors are also to determine a feature of the known user based on the image; and obtain the one or more images of the unknown users based on the feature.

According to some possible implementations, when determining the feature, the one or more processors are to determine a numeric value corresponding to the feature. When obtaining the one or more images of the unknown users, the one or more processors are to modify the numeric value, and obtain the one or more images of the unknown users based on the modified numeric value.

According to some possible implementations, a computer-readable medium stores instructions. The instructions include one or more instructions that, when executed by one or more processors of a device, cause the one or more processors to receive an image of a user, and compare the image to an image of a known user and an image of an unknown user to determine whether the image more closely matches the image of the known user or the image of the known user. The one or more instructions further cause the one or more processors to select, based on the comparing, one of the image of the known user or the image of the unknown user. The image of the known user is selected when the image of the user more closely matches the image of the known user. The one or more instructions also cause the one or more processors to selectively identify the user as the known user. The user being identified as the known user when the image of the known user is selected, and the user not being identified when the image of the unknown user is selected.

According to some possible implementations, the one or more instructions that cause the one or more processors to compare the image include one or more instructions that further cause the one or more processors to compare the image to a images of unknown users. The one or more instructions that cause the one or more processors to select the one of the image of the known user or the image of the unknown user further cause the one or more processors to select one of the image of the known user or one of the images of unknown users, the one or more processors not identifying the user when the one of the images of unknown users is selected.

According to some possible implementations, the one or more instructions further cause the one or more processors to determine a first confidence value based on comparing the image to the image of the known user; and determine a second confidence value based on comparing the image to the image of the unknown user. The one or more instructions that cause the one or more processors to select the one of the image of the known user or the image of the unknown user further cause the one or more processors to select the image of the known user when the first confidence value is greater than the second confidence value, the one or more processors not identifying the user when the one of the plurality of images of unknown users is selected.

According to some possible implementations, the one or more instructions further cause the one or more processors to modify the image of the known user to generate the image of the unknown user.

According to some possible implementations, one or more instructions further cause the one or more processors to receive the image of the known user. The one or more instructions also cause the one or more processors to determine a feature of the known user based on the image; and obtain the image of the unknown user based on the feature.

According to some possible implementations, the one or more instructions that cause the one or more processors to determine the feature further cause the processor to determine a numeric value corresponding to the feature. The one or more instructions that cause the one or more processors to obtain the image of the unknown user further cause the one or more processors to modify the numeric value, and obtain the image of the unknown user based on the modified numeric value.

According to some possible implementations, a system may include means for receiving an image of a user. The system further includes means for comparing the image to a collection of images, the collection of images including a known image and a group of seed images. The system also includes means for determining, based on the comparing, whether the image of the user more closely matches the known image or a seed image, the seed image being included in the group of seed images. The system also includes means for selectively identifying the user as a known user. The means for selectively identifying the user identifying the user as the known user when the image of the user more closely matches the known image. The means for selectively identifying the user not identifying the user when the image of the user more closely matches the seed image.

The above discussion mentions examples in which some implementations may be implemented via one or more methods performed by one or more processors of one or more devices. In some implementations, one or more systems and/or one or more devices may be configured to perform one or more of the acts mentioned above. In some implementations, a computer-readable medium may include computer-executable instructions which, when executed by one or more processors, cause the one or more processors to perform one or more of the acts mentioned above.

BRIEF DESCRIPTION OF THE DRAWINGS

The accompanying drawings, which are incorporated in and constitute a part of this specification, illustrate one or more implementations described herein and, together with the description, explain these implementations. In the drawings:

FIGS. 4A-4D are an example of the process described with respect to FIG. 3;

DETAILED DESCRIPTION

The following detailed description refers to the accompanying drawings. The same reference numbers in different drawings may identify the same or similar elements.

A system may identify known users (e.g., registered users, authorized users, etc.) using a facial recognition application. During registration, images of the known users may be obtained and stored as control images. The system may use the control images to identify the known users.

When a user requests to log on to and/or access the system, the user may allow the system to capture a second image of the user. The system may compare the second image to each of the control images and may determine a confidence score (e.g., a value indicating how closely the captured image matches the control image), for each of the control images, based on the comparison.

The control image with the highest confidence score may be identified. The system may determine if the confidence score for the identified control image is greater than a threshold confidence score. If so, the system may determine a user that is associated with the control image, and may identify the user requesting to log on to and/or access the system as that user. Based on identifying the user, the system may grant the user's request to log on to and/or access the system.

If the confidence score is not greater than the threshold confidence score, the system may determine that the user cannot be identified and may deny the user's request to log on to and/or access the system and/or device. Determining a proper threshold confidence value may be difficult. Setting the threshold confidence value too low may result in unknown users being incorrectly identified as known users. Setting the threshold confidence value too high may prevent known users from being identified.

Systems and/or methods, as described herein, may eliminate the use of a confidence threshold value and may identify a user by comparing an image of the user to images of known and unknown users. When the image of the user is determined to more closely match the image of the known user rather than the images of the unknown users, the user is identified as the known user.

While the invention is described in the context of using images to identify a user, the techniques described are equally applicable to identifying a user based on voice or audio data, fingerprint data, retinal data, and/or other biometric data.

Figure 1:
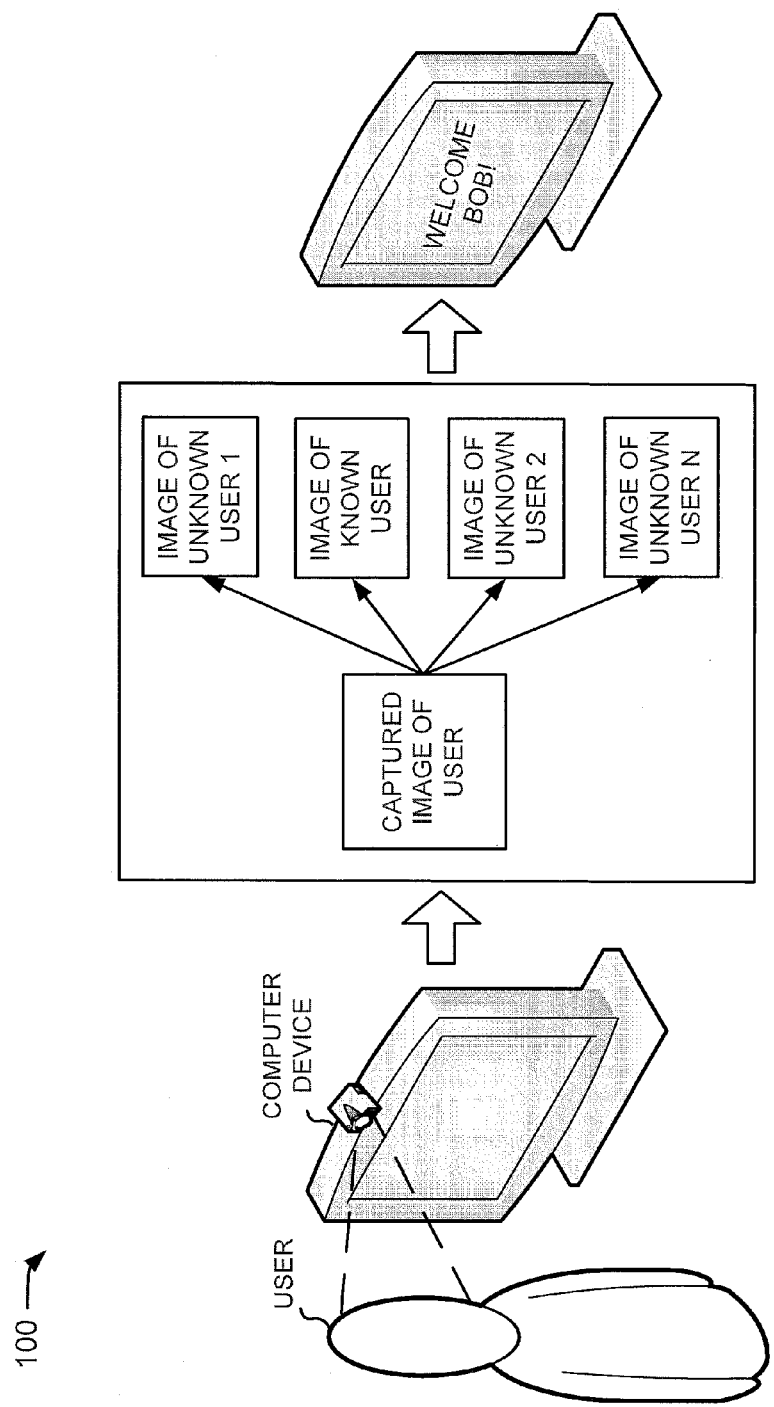
FIG. 1 is a diagram illustrating an overview of an example implementation described herein.

FIG. 1 is a diagram illustrating an overview 100 of an example implementation described herein. With reference to FIG. 1, assume that a computer device includes a facial recognition application that give the user access to the computer device. Further, assume a user, named Bob, wants to access the computer device. Bob may cause the computer device to capture an image of himself. To determine whether to grant access to the computer device to Bob, the computer device may attempt to identify Bob by comparing the captured image to one or more stored images of Bob (e.g., one or more known images) and to a group of images of unknown users.

Based on the comparison, the computer device may determine whether the captured image more closely matches the stored image of Bob or one of the images of the unknown users. If the captured image more closely matches the stored image of Bob, the computer device may determine that the user has been identified. If, on the other hand, the image more closely matches one of the images of the unknown users, the computer device may determine that user cannot be identified.

Assume for FIG. 1 that the computer device determines that the captured image more closely matches the stored image of Bob. The computer device may identify Bob and allow Bob to access the computer device. As shown, the computer device outputs a message that identifies the user and indicates that the user has been granted access to the computer device ("WELCOME BOB").

Figure 2:
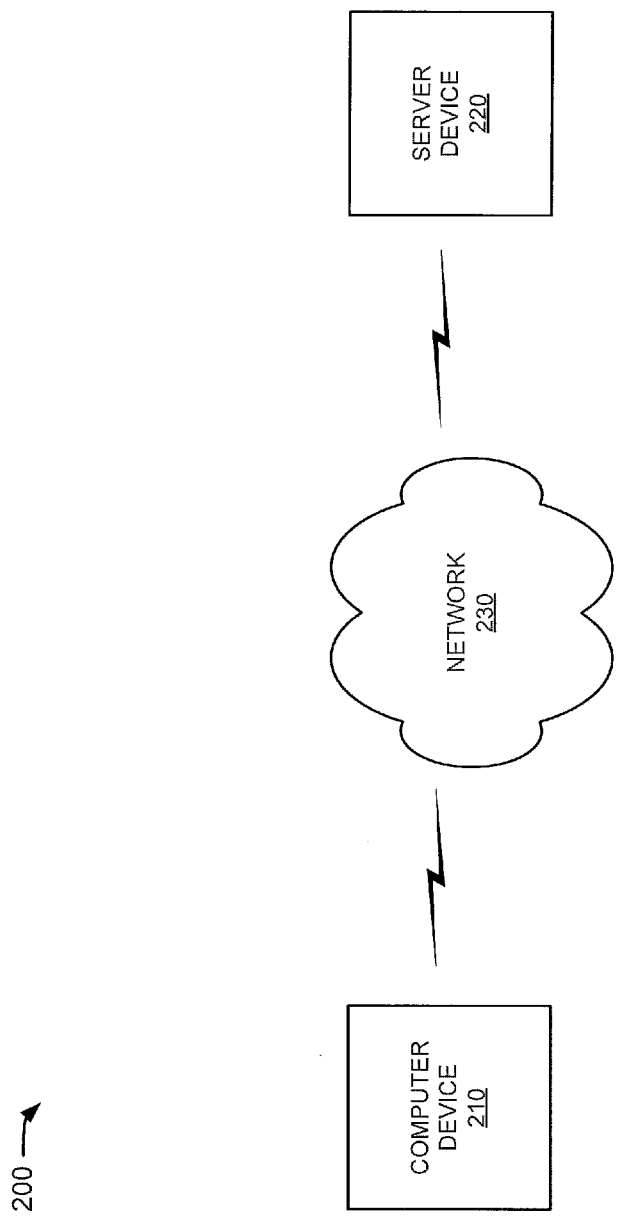
FIG. 2 is a diagram of an example environment in which systems and/or methods described herein may be implemented.

FIG. 2 is a diagram of an example environment 200 in which systems and/or methods described herein may be implemented. Environment 200 may include a computer device 210, a server device 220, and a network 230.

Computer device 210 may include a device, or a collection of devices, that is capable of obtaining a collection of images that includes one or more known images and a group of seed images, and identifying a user based on comparing an image of the user to each image included in the collection of images. Examples of known images may include images of users registered with computer device 210, images of users authorized to access computer device 210, etc. Examples of seed images may include images of users that are not registered with computer device 210, images of users that are not authorized to access computer device 210, etc. Examples of computer device 210 may include a smart phone, a personal digital assistant, a laptop, a tablet computer, a personal computer, and/or another similar type of device.

Server device 220 may include a server device, or a collection of server devices, which may be co-located or remotely located. In some implementations, server device 220 may store seed images and may provide one or more of the seed images to computer device 210, based on a request from computer device 210. In some implementations, server device 210 may receive a request for seed images from computer device 210, obtain seed images from a remote location, such as from one or more other server devices, based on the received request, and provide the obtained seed images to computer device 210.

Network 230 may include any type of network, such as, for example, a local area network ("LAN"), a wide area network ("WAN"), a telephone network, such as the Public Switched Telephone Network ("PSTN") or a cellular network, an intranet, the Internet, or a combination of these or other types of networks. Computer device 210 and server device 220 may connect to network 230 via wired and/or wireless connections. In other words, any one of computer device 210 and/or server device 220 may connect to network 230 via a wired connection, a wireless connection, or a combination of a wired connection and a wireless connection.

Although FIG. 2 shows example components of environment 200, in some implementations, environment 200 may include additional components, fewer components, different components, or differently arranged components than those depicted in FIG. 2. Additionally, or alternatively, one or more components of environment 200 may perform one or more tasks described as being performed by one or more other components of environment 200.

Figure 3:
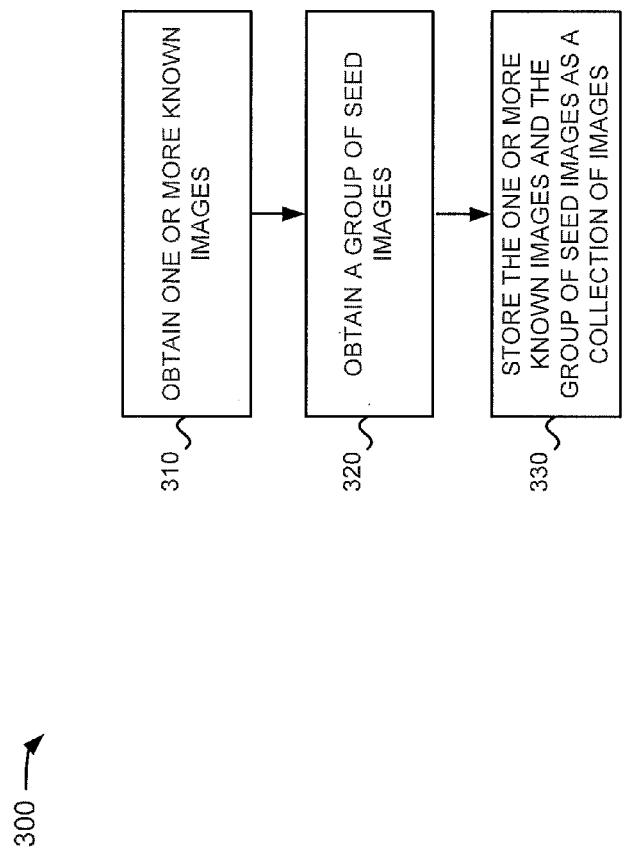
FIG. 3 is a flowchart of an example process for obtaining a collection of images of known and unknown users.

FIG. 3 is a flowchart of an example process 300 for obtaining a collection of images of known and unknown users. In some implementations, process 300 may be performed by computer device 210. In some implementations, some or all of the blocks described below may be performed by a different device or group of devices, including or excluding computer device 210.

Process 300 may include obtaining one or more known images (block 310). For example, computer device 210 may receive a request, from a user of computer device 210, to register with computer device 210. The request may include information identifying the user (e.g., a name of the user, a username associated with the user, etc.). Computer device 210 may, based on receiving the request, obtain one or more images of the user (e.g., known images) and may associate the known images with the information identifying the user.

In some implementations, the one or more known images may be stored in a memory. Computer device 210 may obtain the one or more known images from the memory. For example, computer device 210 may request that a user provide one or more images in response to the user requesting to register with computer device 210. The user may identify one or more stored images that are to be used as the one or more known images. Computer device 210 may obtain the identified images. Additionally, or alternatively, computer device 210 may capture the one or more known images. For example, computer device 210 may capture one or more images of the user using a camera, scanner, or other type of device for capturing images.

Process 300 may include obtaining seed images (block 320). For example, computer device 210 may obtain seed images from server device 220. In some implementations, computer device 210 may request the seed images from server device 220. Server device 220 may obtain the seed images and may provide the seed images to computer device 210 based on the request. Additionally, or alternatively, computer device 210 may generate the seed images. For example, computer device 210 may modify the one or more known images to generate the seed images.

In some implementations, computer device 210 may obtain the seed images based on a feature depicted in the one or more known images. For example, computer device 210 may determine one or more features (e.g., eyes, nose, mouth, chin, etc.) of the user depicted in the one or more known images. Computer device 210 may obtain seed images that depict users having one or more features that are the same and/or similar to the one or more features of the user depicted in the one or more known images.

In some implementations, computer device 210 may request seed images having one or more features that are the same and/or similar to the one or more features of the user depicted in the one or more known images from server device 220. The request may include the one or more known images and/or information identifying the one or more features. Server device 220 may receive the request and may parse the request to determine the one or more features. Server device 220 may obtain seed images that depict unknown users having one or more features that are the same and/or similar to the one or more features determined based on parsing the request. Server device 220 may send the seed images to computer device 210. Computer device 210 may receive seed images from server device 220 in response to the request.

In some implementations, the user may provide information identifying one or more features (e.g., eyes, nose, mouth, chin, hair color, etc.) of the user depicted in the first image. Computer device 210 may obtain the seed images based on the identified features. For example, computer device 210 may provide, via a user interface, a list of features that computer device 210 may use to obtain the seed images. The user interface may allow the user to add and/or remove one or more features from the list of features to create a modified list of features. Computer device 210 may obtain the seed images based on the modified list of features.

In some implementations, the user may indicate a degree of similarity between the selected features and features of users depicted in the seed images. For example, the user interface may allow the user to indicate that the seed images should depict users having a feature that is similar to, is the same size, is the same shape, is positioned within a certain distance of another feature, and/or other information indicating a degree of similarity between the selected features and the features of users depicted in the seed images.

In some implementations, computer device 210 may generate seed images having one or more features that are the same and/or similar to the one or more features of the user depicted in the one or more known images. For example, computer device 210 may modify one or more features of the user depicted in the known image to generate the seed images. In some implementations, computer device 210 may represent one or more features of the user depicted in the one or more known images as one or more numeric values. Computer device 210 may generate permutations of each of the one or more numeric values and may generate the seed images based on the permutations of the one or more numeric values.

In some implementations, computer device 210 may obtain different ones of the seed images based on different features of the user depicted in the one or more known images. For example, computer device 210 may obtain a first set of seed images based on a first feature of the user depicted in the one or more known images and a second set of seed images based on a second, different feature of the user depicted in the one or more known images.

In some implementations, computer device 210 may obtain seed images based on user input. For example, computer device 210 may provide a user interface that allows the user to provide information for obtaining the seed images. The user may provide the information for obtaining the seed images via the user interface. Computer device 210 may obtain the seed images based on the provided information.

In some implementations, the user may provide information identifying a quantity of seed images. Computer device 210 may obtain the quantity of seed images based on the provided information. For example, computer device 210 may provide a user interface that allows a user to indicate a quantity of seed images. In some implementations, the user interface may allow the quantity of seed images may be indicated as a value (e.g., 1, 5, 10, etc.), descriptively (e.g., minimum number required, maximum amount permitted, some, many, few, etc.), and/or as a ratio of a quantity of seed images to a quantity of known images (e.g., 2:1, 5:1, at least 10:1, not more than 20:1, etc.). Computer device 210 may obtain the indicated quantity of seed images.

In some implementations, the user may provide information indicating that the seed images should be obtained randomly and computer device 210 may obtain a random set of second images. For example, the user may provide information indicating that computer device 210 is to randomly select and/or randomly generate the seed images. As an example, computer device 210 may send a request to server device 220 for a particular quantity of randomly selected seed images. Server device 220 may receive the request and may randomly select the particular quantity of seed images. Computer device 210 may receive the particular quantity of randomly selected seed images from server device 220 in response to the request.

In some implementations, the user may provide information indicating that the seed images are to be obtained from a particular device (e.g., server device 220) and/or obtained from a particular collection of images (e.g., images of former users of computer device 210 who are no longer allowed to access computer device 210). Computer device 210 may obtain the seed images from the particular device and/or the particular collection of images based on the information.

In some implementations, a quantity of the seed images may be dependent upon a quantity of known images. For example, computer device 210 may obtain a quantity of seed images that is greater than a quantity of known images. In some implementations, computer device 210 may determine a quantity of seed images as a ratio to a quantity of known images. For example, a ratio of a quantity of seed images to a quantity of known images may be at least 10 to 1, 100 to 1, 1000 to 1, etc. The ratio of the quantity of seed images to the quantity of known images may be determined based on characteristics of computer device 210 (e.g., processing speed, available memory, etc.), a desired runtime, etc.

Process 300 may include storing the one or more known images and the seed images (block 330). For example, computer device 210 may store the one or more known images and the seed images as a collection of images. In some implementations, computer device 210 may store the one or more known images as a set of known images. Computer device 210 may seed the set of known images with seed images and may store the seeded set of known images as a collection of images for identifying users registered with computer device 210.

In some implementations, the one or more known images and/or the seed images may be stored with information indicating whether the image is of a known user or an unknown user. For example, computer device 210 may store each of the one or more known images with information indicating that the known image is an image of a known user. The information stored with each known image may include information identifying a user depicted in the known image and/or information for obtaining information identifying the user depicted in the known image. For example, each known image may be stored with information for retrieving a user profile of the user depicted in the known image.

Additionally, or alternatively, computer device 210 may store the seed images with an identifier that indicates that the seed images are images of unknown users. In some implementations, computer device 210 may store the seed images without an identifier and/or without information identifying a user depicted in the seed image to indicate that the seed image is an image of an unknown user.

In some implementations, computer device 210 may store the one or more known images and the seed images as a data structure. For each of the one or more known images and each of the seed images, the data structure may include information identifying a storage location of the image, information indicating whether the image is a known image or a seed image, and/or for each of the one or more known images, information identifying a user associated with (e.g., depicted in) the known image.

While FIG. 3 shows process 300 as including a particular quantity and arrangement of blocks, in some implementations, process 300 may include fewer blocks, additional blocks, or a different arrangement of blocks. Additionally, or alternatively, some of the blocks may be performed in parallel.

Figure 4A:
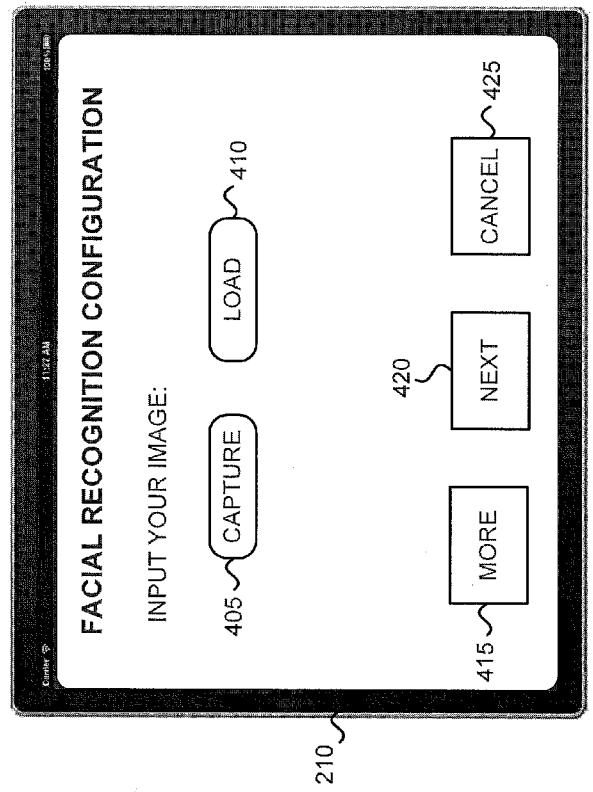

FIGS. 4A-4D are an example 400 of the process described above with respect to FIG. 3. With respect to FIG. 4A, assume that computer device 210 includes a facial recognition application and that a user desires to access computer device 210 using the facial recognition application instead of entering a username and/or password. Further assume that the user initiates a registration process to configure the facial recognition application. Referring now to FIG. 4A, computer device 210 may provide a user interface to enable the user to provide an image of the user (e.g., a known image). As part of configuring the facial recognition application, computer device 210 may provide a user interface that allows the user to provide one or more images of the user. As shown in FIG. 4A, the user interface may provide options relating to the manner by which the user may provide the image or images.

In some implementations, the user interface may include a button 405 ("CAPTURE"). The user may select button 405 to indicate that an image of the user is to be captured by computer device 210. In response to the user selecting button 405, computer device 210 capture an image of the user using an image capture device (e.g., camera, scanner, etc.) associated with computer device 210.

In some implementations, the user interface may include a button 410 ("LOAD"). The user may select button 410 to identify a location from which an image, of the user, is to be obtained. In response to the user selecting button 410, computer device 210 may allow the user to identify the storage location of an image. For example, computer device 210 may provide a list of images stored on computer device 210 and may allow the user to select one of the stored images.

In some implementations, the user interface may include a button 415 ("MORE"). After providing the image of the user, the user may select button 415 to indicate that the user desires to provide another image of the user. In response to the user selecting button 415, computer device 210 may provide another button 405 and/or button 410 to allow the user to provide another image.

In some implementations, the user interface may include a button 420 ("NEXT"). After providing one or more images of the user, the user may select button 420 to indicate that the user does not desire to provide any additional images. In response to the user selecting button 420, computer device 210 may associate the provided images with information identifying the images as known images and/or information identifying the user.

In some implementations, the user interface may include a button 425 ("CANCEL"). The user may select button 425 to indicate that the user wishes to stop configuring the facial recognition application. In response to the user selecting button 425, computer device 210 may terminate the registration process without registering the user as a known user of the facial recognition application.

Figure 4B:
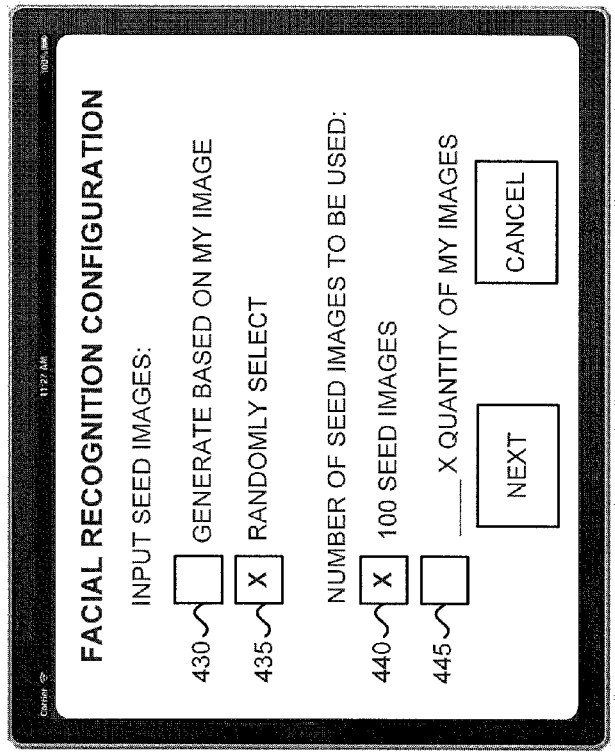

With reference now to FIG. 4B, assume that computer device 210 has obtained the one or more images of the user and that the user has selected button 420. Further assume that in response to the user selecting button 420, computer device 210 initiates a process for obtaining seed images. As shown in FIG. 4B, computer device 210 may allow the user to specify certain information used to obtain the seed images. For example, computer device 210 may allow the user to specify how the seed images are to be obtained and the quantity of seed images to obtain.

In some implementations, the user interface may include a check box 430 ("GENERATE BASED ON MY IMAGE"). The user may select check box 430 to indicate that the seed images should be generated based on the one or more images of the user. In some implementations, the user interface may include a check box 435 ("RANDOMLY SELECT"). The user may select check box 435 to indicate that the seed images should be randomly selected.

In some implementations, the user interface may include a check box 440 ("100 SEED IMAGES") that allows the user to indicate that computer device 210 is to obtain a particular quantity of seed images. In some implementations, the user interface may include an input line 445. Input line 445 may allow the user to specify the quantity of seed images that are to be obtained as a multiple of the quantity of the images that were provided by the user. As shown in FIG. 4B, the user has selected check box 435 and check box 440 to indicate that computer device 210 is to randomly select 100 seed images.

Figure 4C:
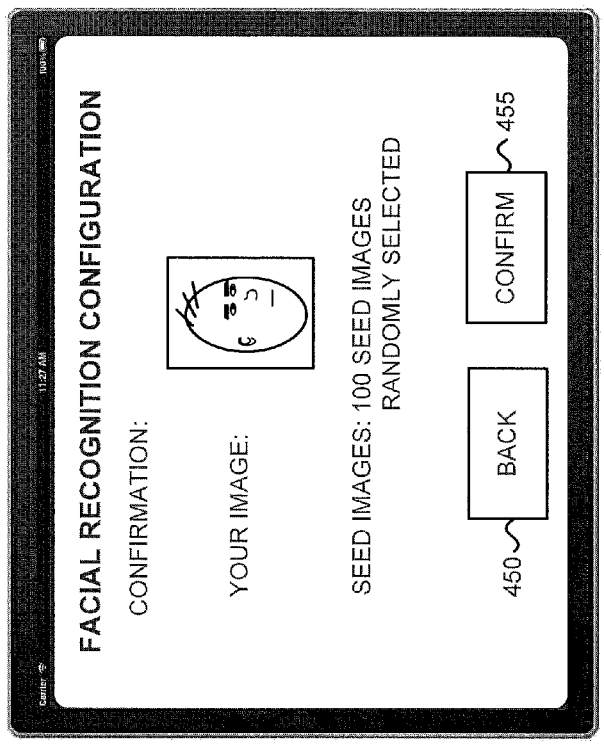

With reference to FIG. 4C, in response to the user providing the information for obtaining the seed images, computer device 210 may provide confirmation information to the user. As shown in FIG. 4C, computer device 210 may cause the image of the user and the information for obtaining the seed images to be displayed via the user interface. In some implementations, the user interface may include button 450 ("BACK"). The user may select button 450 to indicate that the user to desires to provide additional and/or different images of the user and/or that the user desires to modify the information for obtaining the seed images. In response to the user selecting button 450, computer device 210 may allow the user to provide additional and/or different images of the user and/or to modify the information for obtaining the seed images by causing the user interface shown in FIG. 4A and/or FIG. 4B to be displayed.

In some implementations, the user interface may include a button 450 ("CONFIRM"). The user may select button 455 to confirm that computer device 210 is to use the displayed image of the user and that the information for obtaining the seed images is correct. Referring now to FIG. 4D, assume that the user selects button 455. In response to the user selecting button 455, computer device 210 may obtain the seed images based on the information for obtaining the seed images provided by the user. As shown in FIG. 4D, computer device 210 requests 100 randomly selected seed images from server device 220. Server device 220 obtains the requested seed images and provides 100 randomly selected seed images to computer device 210 in response to the request. Computer device 210 may receive the 100 randomly selected seed images from server device 220. Computer device 210 may store the 100 randomly selected seed images with the one or more images of the user as a collection of images that is used to identify users accessing computer device 210.

Figure 5:
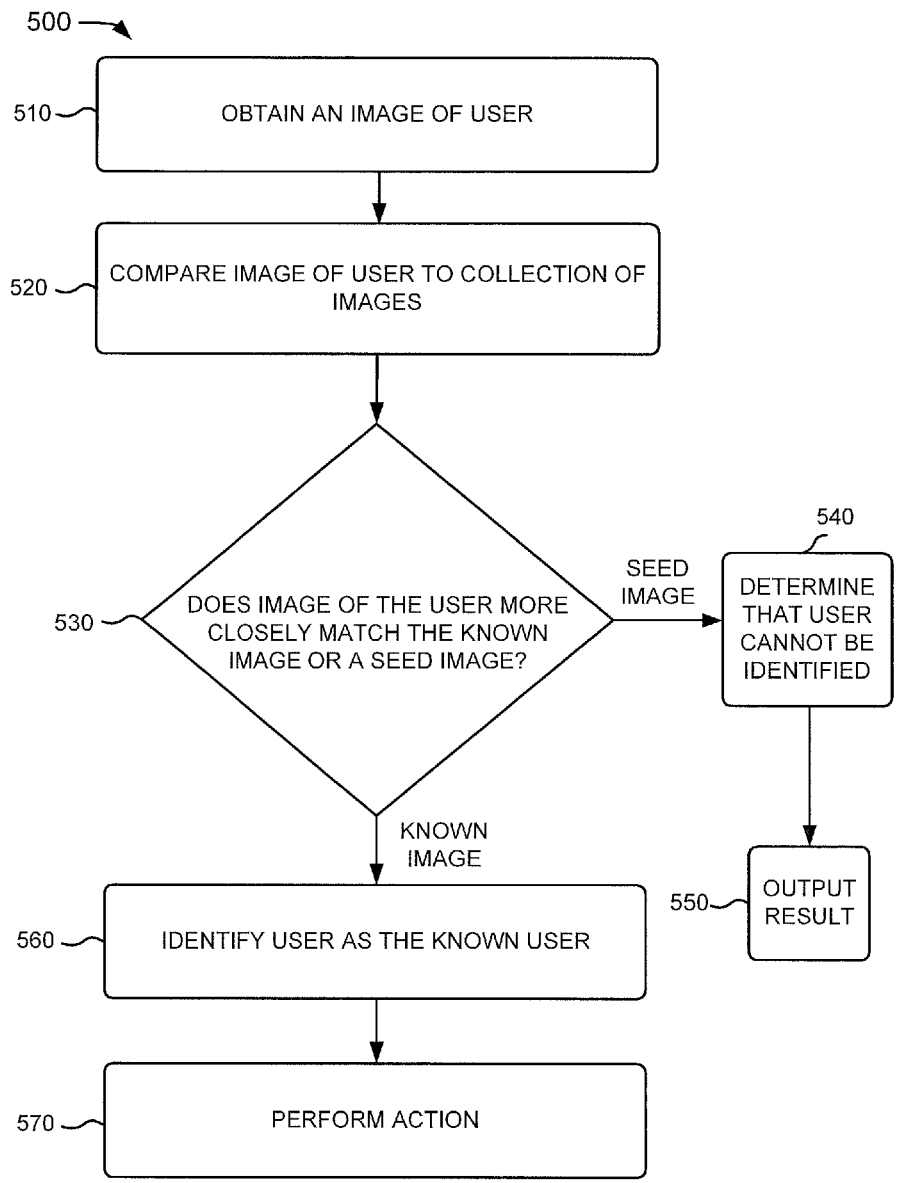
FIG. 5 is a flowchart of an example process for identifying a user using a collection of images of known and unknown users.

FIG. 5 is a flowchart of an example process 500 for identifying a user using a collection of images that includes known images and seed images. While FIG. 5 shows process 500 as including a particular sequence of blocks being performed by computer device 210, in some implementations, some of the blocks of process 500 may be performed by a different device or group of devices, including or excluding computer device 210.

Process 500 may include obtaining an image of a user (block 510). For example, computer device 210 may obtain an image of a user that is to be identified. In some implementations, computer device 210 may capture the image of the user. For example, a user may enter a room. Computer device 210 may detect that the user has entered the room and may cause a camera, video recording device, and/or other type of image capture device to capture an image of the user based on the user entering the room.

Process 500 may include comparing the image of the user to a collection of images (block 520). For example, computer device 210 may compare the image of the user to a collection of images. The collection of images may include at least one known image and a group of seed images. Computer device 210 may compare the image of the user to each of the one or more known images and to each seed image included in the group of seed images.

In some implementations, the collection of images may include sets known images and/or multiple groups of seed images. For example, the collection of images may include a set of known images for each user registered with computer device 210 and/or a corresponding group of seed images. Computer device 210 may have obtained the corresponding group of seed images in response to obtaining the set of known images.

Process 500 may include determining whether the image of the user more closely matches the known image or a seed image (block 530). For example, computer device 210 may determine whether the image of the user more closely matches the known image or a seed image based on comparing the image of the user to the collection of images. In some implementations, based on the comparison, computer device 210 may generate a confidence score for each image included in the collection of images. The confidence score may indicate how closely each image included in the collection of images matches the image of the user. Computer device 210 may determine that the image of the user more closely matches the known image when the confidence score for the known image is greater than the confidence scores for the group of seed images. Computer device 210 may determine that image of the user more closely matches a seed image when the confidence score for the known image is not greater than the confidence score for the seed image.

In those instances in which computer device 210 determines that the image of the user more closely matches the seed image (block 530—SEED IMAGE), process 500 may include determining that the user cannot be identified (block 540) and outputting a result (block 550). For example, when the image of the user more closely matches the seed image, computer device 210 may determine that the user cannot be identified based on the image of the user. In some implementations, computer device 210 may determine that the seed image is associated with an unknown user (e.g., depicts a user that is not registered with computer device 210) and may determine that the user cannot be identified based on the second image being associated with the unknown user. For example, computer device 210 may determine that the seed image is associated with an unknown user based on the seed image being associated with an identifier indicating that the seed image is associated with the unknown user and/or the seed image not being associated with an identifier indicating that the seed image is associated with a known user.

Computer device 210 may output a result based on determining that the seed image is associated with the unknown user. In some implementations, the result may include a message that indicates that the user cannot be identified and/or allows the user to provide another image of the user and/or use an alternative identification method to access computer device 210. For example, the result may include a message indicating that the user cannot be identified and may ask the user whether the user would like to provide another image and/or to enter a username and/or password to access computer device 210.

In those instances in which computer device 210 determines that the image of the user more closely matches the known image (block 530—FIRST IMAGE), process 500 may include identifying the user as a known user (block 560) and performing an action (block 570). For example, when the image of the user more closely matches the known image, computer device 210 may identify the user as a known user and perform an action.

In some implementations, computer device 210 may identify a user associated with the known image. For example, computer device 210 may determine that the known image is associated with an identifier indicating that the known image is associated with a known user. Computer device 210 may identify the user as a particular user based on the identifier and may perform an action based on identifying the user as the particular user.

In some implementations, the action may include, granting the user access to computer device 210, logging the user on to computer device 210, outputting a message identifying the user, indicating that the user has been granted access to computer device 210, loading one or more preferences of the user (e.g., bookmarks, desktop settings, contacts, etc.), and/or other actions. For example, computer device 210 may output a message that identifies the user and indicates that the user is now logged on to computer device 210.

While FIG. 5 shows process 500 as including a particular quantity and arrangement of blocks, in some implementations, process 500 may include fewer blocks, additional blocks, or a different arrangement of blocks. Additionally, or alternatively, some of the blocks may be performed in parallel.

Figure 6A:
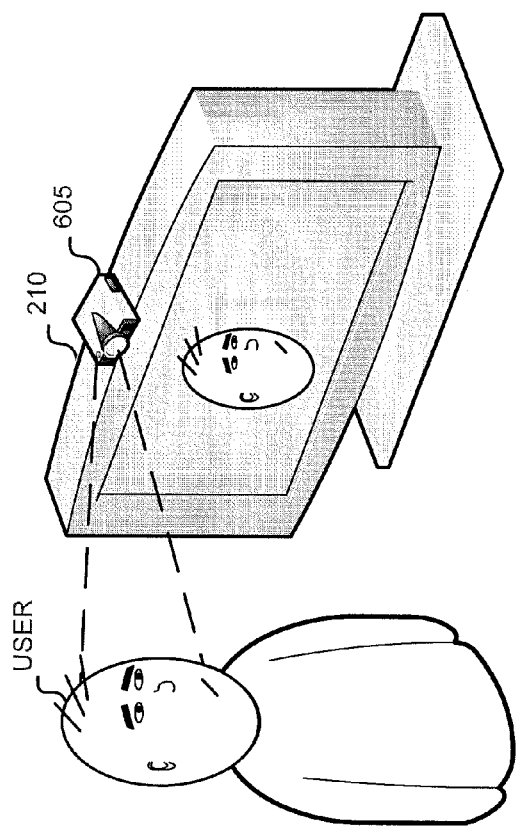
FIGS. 6A-6C are an example of the process described with respect to FIG. 5.
Figure 6B:
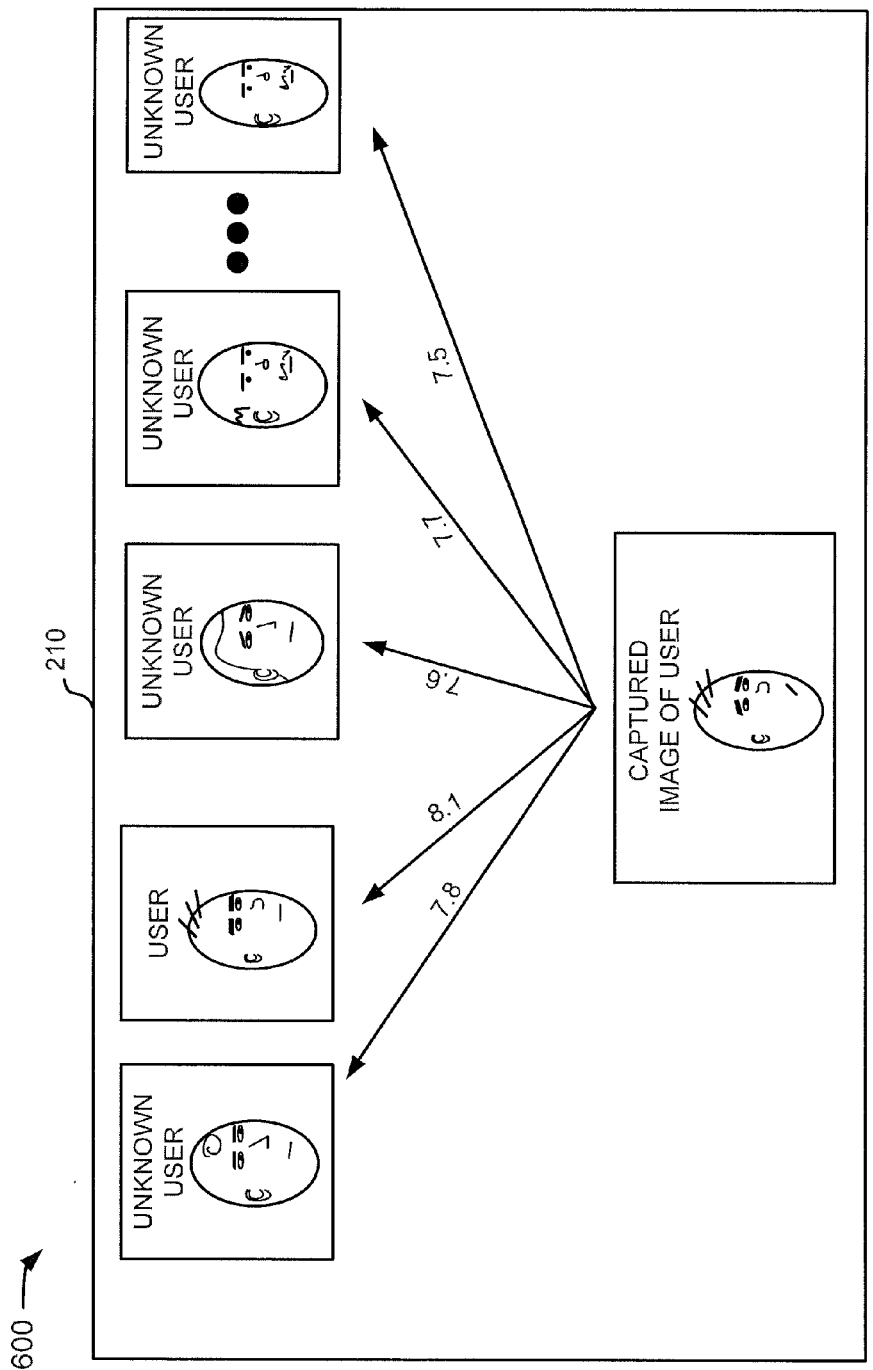
Figure 6C:
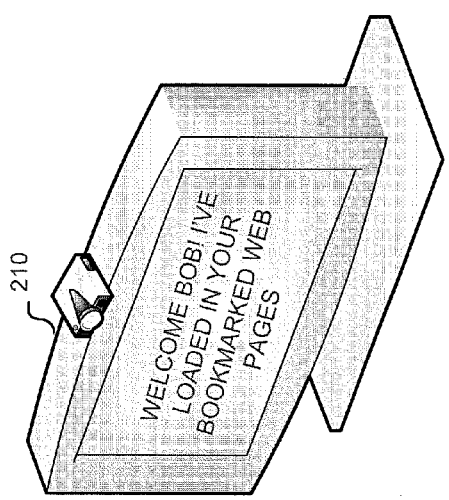

FIGS. 6A-6C are an example 600 of the process described above with respect to FIG. 5. With respect to FIG. 6A, assume that a user, Bob, desires to access computer device 210 using a facial recognition application and that computer device 210 has captured an image of Bob using camera 605. As shown in FIG. 6A, computer device 210 may cause the captured image to be displayed via a display of computer device 210.

Referring now to FIG. 6B, computer device 210 may compare the captured image to a collection of images, which includes a known image and seed images. Based on the comparison, computer device 210 may determine a confidence score for each of the images in the collection. Assume for example 600, that computer device 210 determines a confidence score of 8.1 for the known image and confidence scores 7.8, 7.6, 7.7, and 7.5 for the seed images. Computer device 210 may determine that the captured image more closely matches the known image than the seed images based on the confidence score for the known image being greater than the confidence score for each of the seed images. Computer device 210 may identify the user associated with the known image.

Referring now FIG. 6C, computer device 210 may output a message identifying the user and indicating that computer device 210 has performed a particular action based on identifying the user. As shown in FIG. 6C, computer device 210 outputs a message identifying the user as "BOB" and indicating that computer device 210 has loaded in Bob's bookmarked web pages ("WELCOME BOB! I'VE LOADED IN YOUR BOOKMARKED WEB PAGES").

Figure 7:
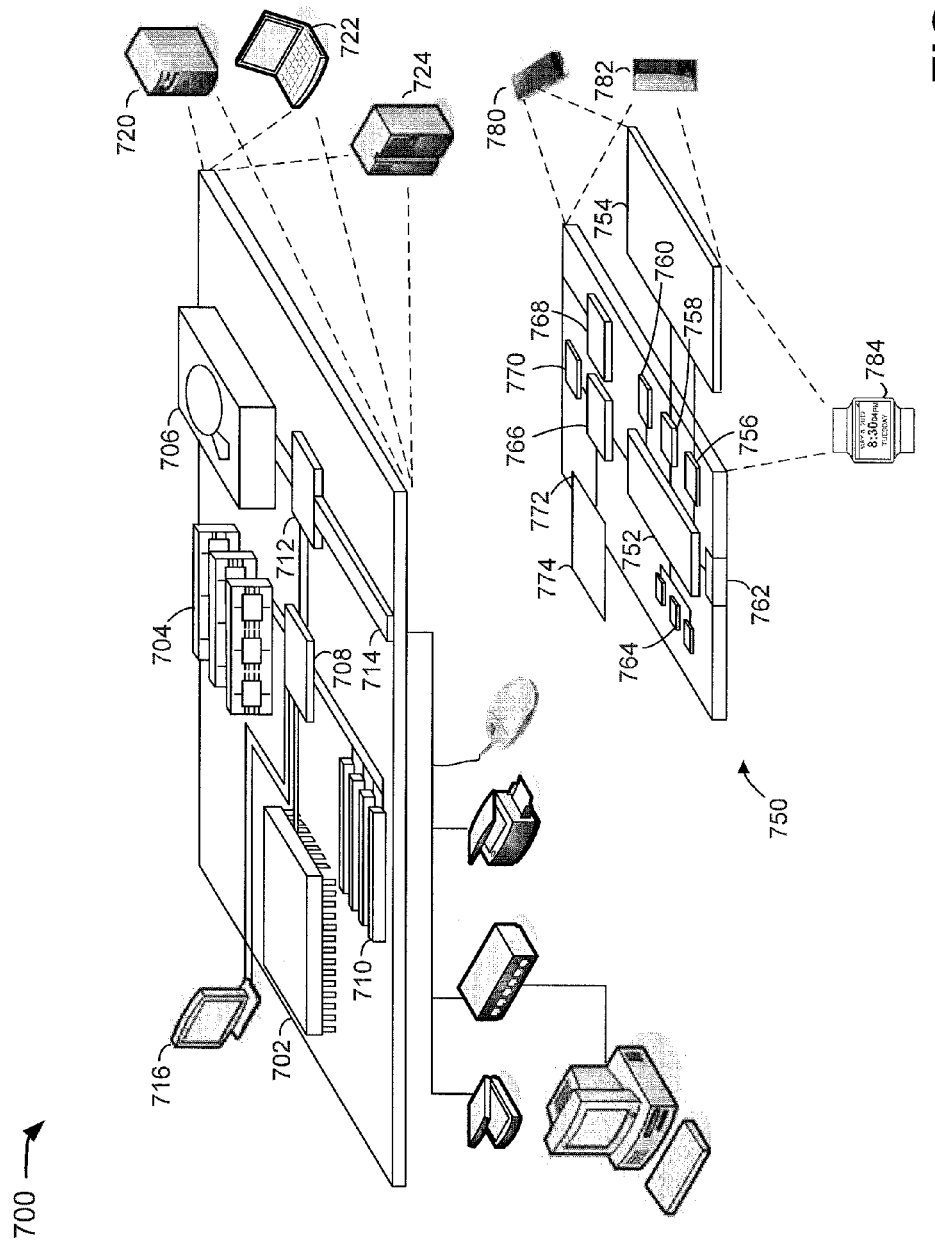
FIG. 7 is a diagram of an example of a generic computer device and a generic mobile computer device.

FIG. 7 is a diagram of an example of a generic computer device 700 and a generic mobile computer device 750, which may be used with the techniques described herein. Generic computer device 700 or generic mobile computer device 750 may correspond to, for example, a computer device 210 and/or a server 220. Computer device 700 is intended to represent various forms of digital computers, such as laptops, desktops, workstations, personal digital assistants, servers, blade servers, mainframes, and other appropriate computers. Mobile computer device 750 is intended to represent various forms of mobile devices, such as personal digital assistants, cellular telephones, smart phones, and other similar computer devices. The components shown in FIG. 7, their connections and relationships, and their functions, are meant to be examples only, and are not meant to limit implementations described herein.

Computer device 700 may include a processor 702, memory 704, a storage device 706, a high-speed interface 708 connecting to memory 704 and high-speed expansion ports 710, and a low speed interface 712 connecting to low speed bus 714 and storage device 706. Each of the components 702, 704, 706, 708, 710, and 712, are interconnected using various busses, and may be mounted on a common motherboard or in other manners as appropriate. Processor 702 can process instructions for execution within the computer device 700, including instructions stored in the memory 704 or on the storage device 706 to display graphical information for a graphical user interface (GUI) on an external input/output device, such as display 716 coupled to high speed interface 708. In other implementations, multiple processors and/or multiple buses may be used, as appropriate, along with multiple memories and types of memory. Also, multiple computer devices 700 may be connected, with each device providing portions of the necessary operations, as a server bank, a group of blade servers, or a multi-processor system, etc.

Memory 704 stores information within the computer device 700. In some implementations, memory 704 includes a volatile memory unit or units. In some implementations, memory 704 includes a non-volatile memory unit or units. The memory 704 may also be another form of computer-readable medium, such as a magnetic or optical disk. A computer-readable medium may refer to a non-transitory memory device. A memory device may refer to storage space within a single storage device or spread across multiple storage devices.

The storage device 706 is capable of providing mass storage for the computer device 700. In some implementations, storage device 706 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described herein. The information carrier is a computer or machine-readable medium, such as memory 704, storage device 706, or memory on processor 702.

High speed controller 708 manages bandwidth-intensive operations for the computer device 700, while low speed controller 712 manages lower bandwidth-intensive operations. Such allocation of functions is exemplary only. In one implementation, high-speed controller 708 is coupled to memory 704, display 716 (e.g., through a graphics processor or accelerator), and to high-speed expansion ports 710, which may accept various expansion cards (not shown). In this implementation, low-speed controller 712 is coupled to storage device 706 and low-speed expansion port 714. The low-speed expansion port, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

Computer device 700 may be implemented in a number of different forms, as shown in the figure. For example, computer device 700 may be implemented as a standard server 720, or multiple times in a group of such servers. Computer device 700 may also be implemented as part of a rack server system 724. In addition, computer device 700 may be implemented in a personal computer, such as a laptop computer 722. Alternatively, components from computer device 700 may be combined with other components in a mobile device (not shown), such as mobile computer device 750. Each of such devices may contain one or more of computer devices 700, 750, and an entire system may be made up of multiple computer devices 700, 750 communicating with each other.

Mobile computer device 750 may include a processor 752, memory 764, an input/output ("I/O") device, such as a display 754, a communication interface 766, and a transceiver 768, among other components. Mobile computer device 750 may also be provided with a storage device, such as a micro-drive or other device, to provide additional storage. Each of the components 750, 752, 764, 754, 766, and 768 are interconnected using various buses, and several of the components may be mounted on a common motherboard or in other manners as appropriate.

Processor 752 can execute instructions within mobile computer device 750, including instructions stored in memory 764. Processor 752 may be implemented as a chipset of chips that include separate and multiple analog and digital processors. Processor 752 may provide, for example, for coordination of the other components of mobile computer device 750, such as control of user interfaces, applications run by mobile computer device 750, and wireless communication by mobile computer device 750.

Processor 752 may communicate with a user through control interface 758 and display interface 756 coupled to a display 754. Display 754 may be, for example, a TFT LCD (Thin-Film-Transistor Liquid Crystal Display) or an OLED (Organic Light Emitting Diode) display, or other appropriate display technology. Display interface 756 may comprise appropriate circuitry for driving display 754 to present graphical and other information to a user. Control interface 758 may receive commands from a user and convert them for submission to the processor 752. In addition, an external interface 762 may be provide in communication with processor 752, so as to enable near area communication of mobile computer device 750 with other devices. External interface 762 may provide, for example, for wired communication in some implementations, or for wireless communication in other implementations, and multiple interfaces may also be used.

Memory 764 stores information within mobile computer device 750. Memory 764 can be implemented as one or more of a computer-readable medium or media, a volatile memory unit or units, or a non-volatile memory unit or units. Expansion memory 774 may also be provided and connected to mobile computer device 750 through expansion interface 772, which may include, for example, a SIMM (Single In Line Memory Component) card interface. Such expansion memory 774 may provide extra storage space for device 750, or may also store applications or other information for mobile computer device 750. Specifically, expansion memory 774 may include instructions to carry out or supplement the processes described above, and may include secure information also. Thus, for example, expansion memory 774 may be provide as a security component for mobile computer device 750, and may be programmed with instructions that permit secure use of device 750. In addition, secure applications may be provided via the SIMM cards, along with additional information, such as placing identifying information on the SIMM card in a non-hackable manner.

Expansion memory 774 may include, for example, flash memory and/or NVRAM memory. In some implementations, a computer program product is tangibly embodied in an information carrier. The computer program product contains instructions that, when executed, perform one or more methods, such as those described above. The information carrier is a computer- or machine-readable medium, such as the memory 764, expansion memory 774, or memory on processor 752, that may be received, for example, over transceiver 768 or external interface 762.

Mobile computer device 750 may communicate wirelessly through communication interface 766, which may include digital signal processing circuitry where necessary. Communication interface 766 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 768. In addition, short-range communication may occur, such as using a Bluetooth, Wi-Fi, or other such transceiver (not shown). In addition, GPS (Global Positioning System) receiver component 770 may provide additional navigation- and location-related wireless data to mobile computer device 750, which may be used as appropriate by applications running on mobile computer device 750.

Mobile computer device 750 may also communicate audibly using audio codec 760, which may receive spoken information from a user and convert it to usable digital information. Audio codec 760 may likewise generate audible sound for a user, such as through a speaker, e.g., in a handset of mobile computer device 750. Such sound may include sound from voice telephone calls, may include recorded sound (e.g., voice messages, music files, etc.) and may also include sound generated by applications operating on mobile computer device 750.

Mobile computer device 750 may be implemented in a number of different forms, as shown in the figure. For example, mobile computer device 750 may be implemented as a cellular telephone 780. Mobile computer device 750 may also be implemented as part of a smart phone 782, personal digital assistant, a watch 784, or other similar mobile device.

Various implementations of the systems and techniques described herein can be realized in digital electronic circuitry, integrated circuitry, specially designed ASICs (application specific integrated circuits), computer hardware, firmware, software, and/or combinations thereof. These various implementations can include implementations in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any apparatus and/or device (e.g., magnetic discs, optical disks, memory, Programmable Logic Devices ("PLDs")) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described herein can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described herein can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

Systems and methods, described herein, may identify a user by comparing an image of the user to images of known and unknown users. When the image of the user is determined to more closely match the image of the known user rather than the images of the unknown users, the user is identified as the known user.

The foregoing description provides illustration and description, but is not intended to be exhaustive or to limit the implementations to the precise form disclosed. Modifications and variations are possible in light of the above disclosure or may be acquired from practice of the implementations.

As used herein, the term component is intended to be broadly interpreted to refer to hardware or a combination of hardware and software, such as software executed by a processor.

It will be apparent that systems and methods, as described above, may be implemented in many different forms of software, firmware, and hardware in the implementations illustrated in the figures. The actual software code or specialized control hardware used to implement these systems and methods is not limiting of the implementations. Thus, the operation and behavior of the systems and methods were described without reference to the specific software code—it being understood that software and control hardware can be designed to implement the systems and methods based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

No element, act, or instruction used in the present application should be construed as critical or essential unless explicitly described as such. Also, as used herein, the article "a" is intended to include one or more items and may be used interchangeably with the phrase "one or more." Where only one item is intended, the term "one" or similar language is used. Further, the phrase "based on" is intended to mean "based, at least in part, on" unless explicitly stated otherwise.

What is claimed is:

1. A method comprising:
   providing, by one or more processors of a device and for display, a user interface that includes a first option to obtain a group of seed images based on a known image and a second option to obtain the group of seed images by randomly selecting the group of seed images;
   identifying, by the one or more processors, a selection of the first option or the second option;
   obtaining, by the one or more processors, the group of seed images based on the selection;
   receiving, by the one or more processors, an image of a user;
   comparing, by the one or more processors, the image to a collection of images,
      the collection of images including the known image and the group of seed images;
   determining, by the one or more processors and based on the comparing, that the image of the user more closely matches the known image than a seed image of the group of seed images; and
   identifying, by the one or more processors, the user as a known user based on determining that the image of the user more closely matches the known image than the seed image.

2. The method of claim 1, where, when the selection is of the first option, obtaining the group of seed images comprises:
   obtaining a set of known images,
      the set of known images including the known image; and
   modify the set of known images to obtain the group of seed images.

3. The method of claim 2, where a ratio of a quantity of the group of seed images to a quantity of known images included in the set of known images is at least 10 to 1.

4. The method of claim 1, where, when the selection is of the first option, obtaining the group of seed images comprises:
   modifying the known image to generate the group of seed images.

5. The method of claim 1, where determining that the image of the user more closely matches the known image than the seed image comprises:
   determining a first confidence value based on comparing the image of the user to the known image;
   determining a second confidence value based on comparing the image of the user to the seed image;
   determining that the first confidence value is greater than the second confidence value; and
   determining that the image of the user more closely matches the known image based on determining that the first confidence value is greater than the second confidence value.

6. The method of claim 1, where, when the selection is of the first option, obtaining the group of seed images comprises:
   receiving the known image;
   determining a feature of the user based on the known image; and
   obtaining the group of seed images based on the feature.

7. The method of claim 6,
   where determining the feature includes:
      determining a numeric value corresponding to the feature; and
   where obtaining the group of seed images includes:
      modifying the numeric value, and
      obtaining the group of seed images based on the modified numeric value.

8. A device comprising:
   one or more processors to:
      provide, for display, a first option to obtain one or more images of unknown users based on an image of a known user;
      provide, for display, a second option to obtain the one or more images of the unknown users by randomly selecting the one or more images of the unknown users;
      identify a selection of the first option or the second option;
      obtain the one or more images of the unknown users based on the selection;
      receive a particular image of a user;
      compare the particular image to a collection of images,
         the collection of images including:
            the image of the known user, and
            the one or more images of the unknown users;
      determine, based on the comparing, whether the particular image more closely matches:
         the image of the known user, or
         one of the one or more images of the unknown users;
      selectively identify the user as the known user,
         the one or more processors identifying the user as the known user when the particular image more closely matches the image of the known user, and
         the one or more processors not identifying the user as the known user when the particular image of the user more closely matches the one of the one or more images of the unknown users; and
      grant, when the user is identified as the known user, the user access to the device.

9. The device of claim 8, where, when obtaining the one or more images of the unknown users and when the selection is of the first option, the one or more processors are to:
   obtain a set of images of known users,
      the set of images of known users including the image of the known user; and modify the set of images of the known users to obtain the one or more images of the unknown users.

10. The device of claim 9, where a ratio of a quantity of the one or more images of the unknown users is greater than a quantity of the set of images of the known users.

11. The device of claim 8, where, when obtaining the one or more images of the unknown users and when the selection is of the first option, the one or more processors are to:
   modify the image of the known user to generate the one or more images of the unknown user.

12. The device of claim 8,
   where the one or more processors are further to:
      determine a first confidence value based on comparing the particular image of the user to the image of the known user; and
      determine one or more second confidence values based on comparing the particular image of the user to the one or more images of the unknown users; and
   where, when determining whether the particular image of the user more closely matches the image of the known user or the one or images of the unknown users, the one or more processors are to:
      determine that the particular image of the user more closely matches the image of the known user when the first confidence value is greater than each of the one or more second confidence values.

13. The device of claim 8, where, when obtaining the one or more images of the unknown users and when the selection is of the first option, the one or more processors are further to:
   receive the image of the known user;
   determine a feature of the known user based on the image; and
   obtain the one or more images of the unknown users based on the feature.

14. The device of claim 13,
   where, when determining the feature, the one or more processors are to:
      determine a numeric value corresponding to the feature; and
   where, when obtaining the one or more images of the unknown users, the one or more processors are to:
      modify the numeric value, and
      obtain the one or more images of the unknown users based on the modified numeric value.

15. A non-transitory computer-readable medium storing instructions, the instructions comprising:
   one or more instructions that, when executed by one or more processors of a device, cause the one or more processors to:
      provide, for display, a first option to obtain an image of an unknown user based on an image of a known user;
      provide, for display, a second option to obtain the image of the unknown user by randomly selecting the image of the unknown user;
      identify a selection of the first option or the second option;
      obtain the image of the unknown user based on the selection;
      receive a particular image of a user;
      compare the particular image to the image of the known user and the image of the unknown user to determine whether the particular image of the user more closely matches the image of the known user or the image of the unknown user;
      select, based on the comparing, one of:
         the image of the known user, or
         the image of the unknown user,
            the image of the known user being selected when the image of the user more closely matches the image of the known user, and
            the image of the unknown user being selected when the image of the user more closely matches the image of the unknown user; and
      selectively identify the user as the known user,
         the user being identified as the known user when the image of the known user is selected, and
         the user not being identified when the image of the unknown user is selected.

16. The non-transitory computer-readable medium of claim 15,
   where the one or more instructions to compare the particular image include:
      one or more instructions that, when executed by the one or more processors, cause the one or more processors to compare the particular image to a plurality of images of unknown users;
   where the plurality of images of the unknown users include the image of the unknown user; and
   where the one or more instructions to select the one of the image of the known user or the image of the unknown user include:
      one or more instructions that, when executed by the one or more processors, cause the one or more processors to select one of:
         the image of the known user, or
         one of the plurality of images of the unknown users,
            the one or more processors not identifying the user when the one of the plurality of images of the unknown users is selected.

17. The non-transitory computer-readable medium of claim 15, where the one or more instructions to obtain the image of the unknown user comprise:
   one or more instructions that, when executed by the one or more processors, cause the one or more processors to modify the image of the known user to generate the image of the unknown user when the selection is of the first option.

18. The non-transitory computer-readable medium of claim 15,
   where the instructions further comprise:
      one or more instructions that, when executed by the one or more processors, cause the one or more processors to:
         determine a first confidence value based on comparing the particular image of the user to the image of the known user; and
         determine a second confidence value based on comparing the particular image of the user to the image of the unknown user; and
   where the one or more instructions to select the one of the image of the known user or the image of the unknown user include:
      one or more instructions that, when executed by the one or more processors, cause the one or more processors to select the image of the known user when the first confidence value is greater than the second confidence value,
         the image of the unknown user being selected when the first confidence value is not greater than the second confidence value.

19. The non-transitory computer-readable of claim 15, where the one or more instructions to obtain the image of the unknown user comprise:

one or more instructions that, when executed by the one or more processors, cause the one or more processors to:
receive the image of the known user;
determine a feature of the known user based on the image of the known user; and
obtain the image of the unknown user based on the feature.

20. The non-transitory computer-readable medium of claim 19,
where the one or more instructions to determine the feature include:
one or more instructions that, when executed by the one or more processors, cause the one or more processors to determine a numeric value corresponding to the feature; and
where the one or more instructions to obtain the image of the unknown user include:
one or more instructions that, when executed by the one or more processors, cause the one or more processors to:
modify the numeric value, and
obtain the image of the unknown user based on the modified numeric value.

* * * * *